Feb. 4, 1969 H. MÜLLER 3,425,726
PROFILE RAIL PROVIDED WITH ATTACHMENT ELEMENT
Filed Feb. 1, 1967
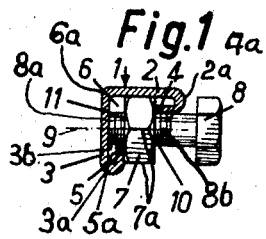
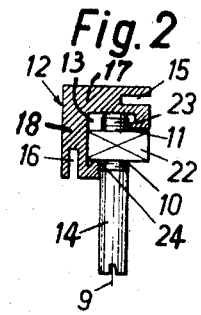
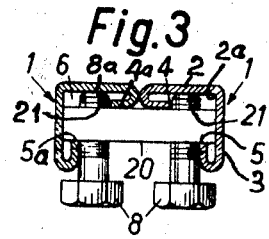
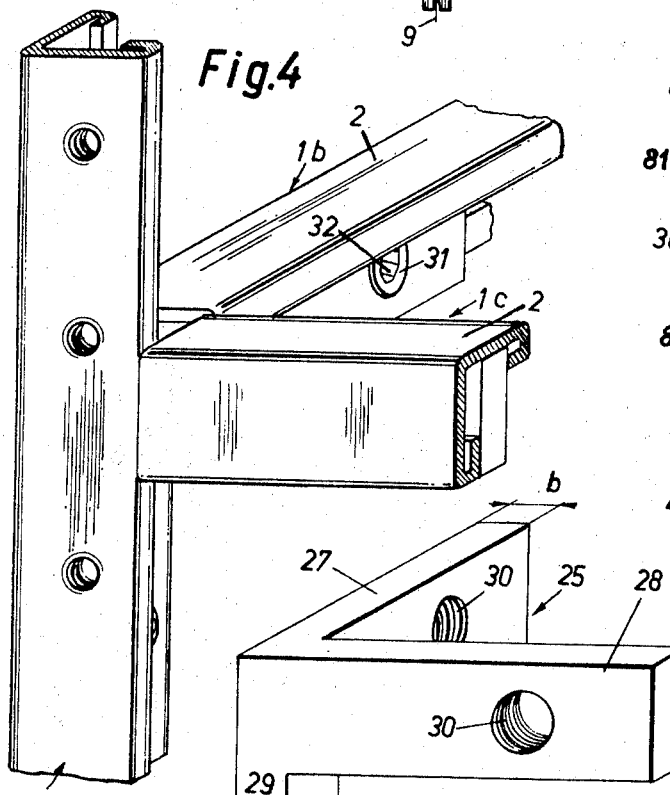
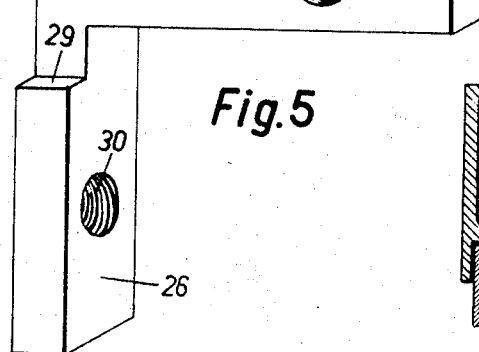
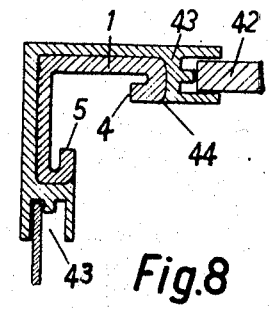
INVENTOR
HERMANN MÜLLER
BY Jacobi & Davidson
Attorneys

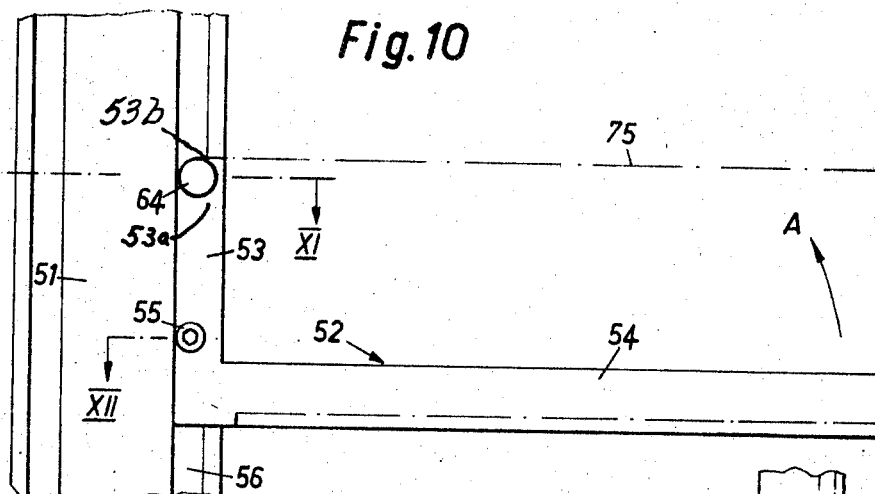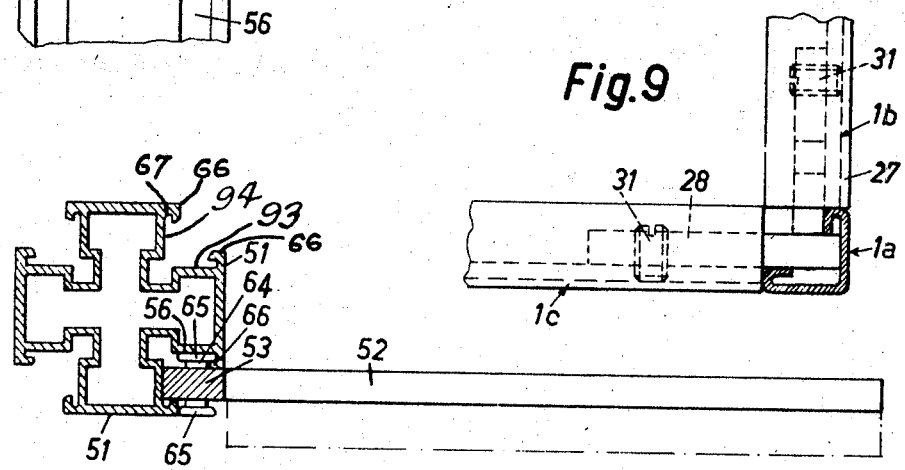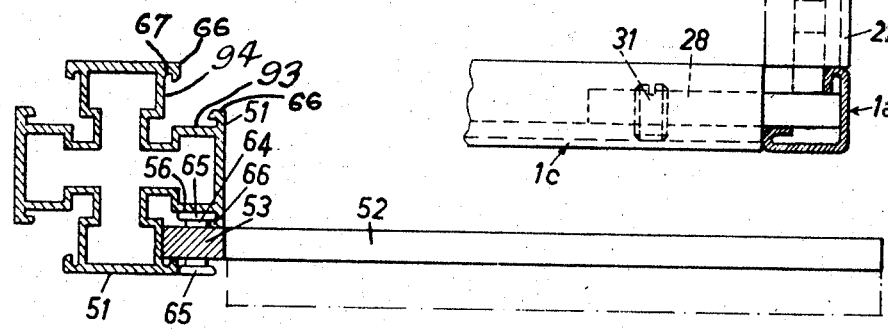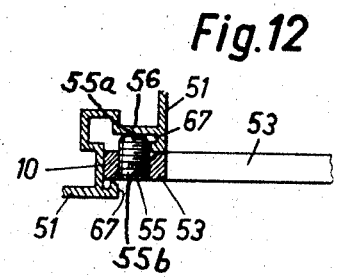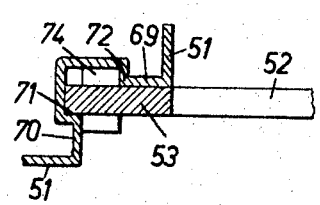

United States Patent Office 3,425,726
Patented Feb. 4, 1969

3,425,726
PROFILE RAIL PROVIDED WITH
ATTACHMENT ELEMENT
Hermann Müller, Zugerstrasse 43,
Cham, Switzerland
Filed Feb. 1, 1967, Ser. No. 613,279
Claims priority, application Switzerland, Feb. 2, 1966,
1,478/66; June 24, 1966, 9,159/66
U.S. Cl. 287—189.36                                     15 Claims
Int. Cl. F16b 7/18, 1/00

ABSTRACT OF THE DISCLOSURE

A profile rail equipped with an attachment element by means of which it is possible to quickly, easily and reliably connect to such profile rail other components or further profile rails, in order to be able to form a desired structural unit. The profile rail advantageously has a pair of shoulders in the region of a longitudinal groove, and the attachment element includes a member, such as a suitable nut member having a threaded opening in which a screw or the like is piercingly threadably received. One of the shoulders of the profile rail retains the screw against lateral displacement and the other shoulders serves as an impact surface for the nut member when the screw is tightened and bears against a surface or inner wall of the profile rail. Simple tightening of the screw brings about a rapid and positive releasable connection of the attachment element with the profile rail.

Background of the invention

The present invention relates to a profile rail provided with at least one attachment or connecting element. More specifically, the invention contemplates equipping a profile rail with at least one attachment element in order to enable other components or other profile rail members to be quickly and easily releasably connected with such profile rail. In this manner, it is possible to expeditiously form many different types of structural units, such as frameworks, electrical switch boxes or cabinets, frame constructions, display stands, exhibition rooms, loading or storage structures, book cases, shelves, partition walls, scaffolds, and so forth, only to mention a few of the possibilities.

Summary of the invention

A primary object of the present invention is to provide a profile rail with one or more attachment elements so that either further components can be easily and quickly affixed to such profile rail, or such profile rail can be releasably connected with other, similar, transversely extending profile rails.

Another noteworthy object of the present invention relates to the combination of a profile rail equipped with at least one attachment element which enables the quick, reliable, easy interconnection of further components or other profile rails to the aforementioned profile rail equipped with said at least one attachment element.

Yet, another significant object of this invention is directed to a profile rail provided with at least one attachment element which is of relatively simple construction, economical to manufacture, and easy to operate, so that still other profile rails which extend transverse to the aforesaid profile rail can be quickly and easily releasably affixed thereto, or other components can be quickly and easily releasably affixed thereto.

A further noteworthy object of the present invention deals with a profile rail having simple and easy to operate attachment means which enable other components, or still other profile rail members, to be releasably and positively affixed to the aforesaid profile rail in a most simple and efficient manner, so that the most varied types of structural units can be formed with a minimum of effort.

In order to implement these and still further objects of the invention which will become more readily apparent as the description proceeds, the invention contemplates the combination of a profile rail and at least one attachment or connecting element provided for such profile rail. This profile rail possesses at least one resilient or deformable longitudinal or lengthwise extending groove equipped with two longitudinal shoulders disposed at substantially right angles with respect to one another. Each attachment element incorporates at least one threaded opening in which a screw member or the like threadably engages. This screw member is secured against lateral displacement by one of the shoulders and the attachment element bears against or is supported by the other shoulder when the screw member presses against the base or the wall means of the profile rail.

Owing to this physical structure it is possible by very simple expedients to form a frame- or skeleton construction which, for instance, is extremely suitable for frames, stands, supports, electrical switching cabinets or boxes, framework constructions and the like.

Brief description of the drawings

The invention will be better understood, and objects other than those set forth above, will become apparent, when consideration is given to the following detailed description thereof. Such description makes reference to the annexed drawings wherein:

FIGURE 1 is a cross-sectional view of a profile rail having affixed thereto a nut member and screw;

FIGURE 2 is a cross-sectional view of a modified form of profile rail having secured thereto threaded bolt means and a threaded disk member;

FIGURE 3 depicts two profile rail members which are positioned to abut or bear against one another and which are releasably interconnected by means of a common attachment or connecting element with the aid of two screws;

FIGURE 4 is a fragmentary perspective view of three profile rails which are releasably interconnected with one another and shown at the location of contact or impact of such three profile rails with one another;

FIGURE 5 is a perspective view showing details of a three-legged attachment member as such is used for the connection of the three profile rails shown in FIGURE 4;

FIGURE 6 is a cross-sectional view through a further embodiment of profile rail in which the latter has a cross-sectional form which differs somewhat from that of the embodiments of FIGURES 1 and 2;

FIGURE 7 is a cross-sectional view of a further form of profile rail;

FIGURE 8 is a cross-sectional view of a profile rail provided with covering means;

FIGURE 9 is a fragmentary, top plan view, partly in section, of the corner connection of the profile rails shown in FIGURE 4;

FIGURE 10 is a front view of a profile rail equipped with an inserted or mounted support or carrier member;

FIGURE 11 is a cross-sectional view of the arrangement shown in FIGURE 10, taken along the line XI—XI thereof;

FIGURE 12 is a cross-sectional view of the arrangement of FIGURE 10, taken along the line XII—XII thereof; and FIGURE 13 is a cross-sectional view, similar to that of FIGURE 11, taken through a variant of the invention.

Description of the preferred embodiments

Describing now the drawings and, in particular, turning attention to the profile rail 1 depicted in FIGURE 1 it will be recognized that, in cross-section, such exhibits two leg members 2 and 3 which are disposed substantially at right angles with respect to one another. The marginal edges 2a and 3a of these leg members 2 and 3, respectively, are flexed inwardly to provide the shoulders 4 and 5 respectively. As a result, both of the leg members 2 and 3 enclose a resilient longitudinal or lengthwise extending groove 6. Further, it will be recognized that this profile rail 1 is substantially mirror symmetrical with respect to a substantially diagonal plane taken through the plane of joinder of the pair of leg members 2, 3 which meet at a location defining the corner 6a of such profile rail 1.

Continuing, it should be appreciated that at such type of profile rail 1, preferably stamped from sheet steel or the like, it is possible to accommodate or mount attachment or connecting elements, in the exemplary embodiment a screw member 8 provided with a threaded nut 7. The lengthwise or longitudinal axis 9 of this screw member 8 extends substantially perpendicular to both of the end or front faces 10 and 11 of the threaded nut 7, or equivalent structure, and is further disposed substantially in parallelism with the leg member 2. Now, if the screw member 8 is tightened then the forward or free end 8a of such screw member 8 bears against the inner wall or base 3b of the leg member 3 and, consequently, presses the threaded nut 7 against the shoulder 4. In this manner, there is brought about a positive clamping connection between the profile rail 1 and the threaded nut 7 of the attachment elements 7, 8. Furthermore, it should be understood that the shoulder 5 forms a lateral stop or impact member for the threaded nut 7. Moreover, this threaded nut 7 can be a commercially available hexagonal nut, whereby rotation of such nut is prevented in that, the corners 7a of the threaded nut 7 bear against the wall of the profile rail 1, in this case the inner wall 2b of the leg member 2, since no or only a small intermediate space appears between the corners or surfaces 7a of the hexagonal nut 7 and the leg member 2. Moreover, the outer diameter of the threaded portion 8b of the screw member 8 preferably approximately corresponds to the spacing or distance between the inner marginal edge 5a of the shoulder 5 and the front face or surface 4a of the other shoulder 4.

Broadly speaking, insofar as the remaining embodiments of the invention which are depicted herein and which will be described in detail as this description proceeds, it will be undoubtedly recognized that, in the main, these various embodiments all incorporate the general principles of structural features heretofore described with regard to the specific embodiment of FIGURE 1. Therefore, when considering the further individual embodiments herein after there will primarily only be described the more important differences from that of the previous embodiment, or further, there will be amplified certain features which have been touched upon during the previous description of the embodiment of FIGURE 1. Hence, turning now to the embodiment of profile rail 12 shown in FIGURE 2 it will be seen that such possesses a somewhat different form from that of the profile rail 1 of FIGURE 1 and is particularly suitable to be manufactured as extruded aluminum rails. Once again, this profile rail 12 exhibits a resilient longitudinal groove 13 capable of receiving a shaft screw 14, or equivalent structure, and onto which there has been threadably mounted a square nut member 22. Further, this profile rail 12 is likewise provided with two longitudinal ribs or shoulders 23 and 24 at the leg members 17 and 18, respectively, which bound the aforementioned longitudinal groove 13. Further, this profile rail 12 is equipped with a pair of longitudinal slits 15 and 16 at the marginal edge of each leg member 17 and 18, respectively, and located laterally adjacent the longitudinal ribs or shoulders 23 and 24 respectively. As shown, these longitudinal slits 15 and 16 are open towards the outside and serve to receive appropriate covering sheets or panels, or other equivalent structure.

Also, with respect to this embodiment the releasable connection of the attachment members takes place in the same manner and analogous to that of the embodiment of FIGURE 1. More precisely, the screw member 14 together with the threaded nut 22 can be inserted or removed at an optional location of the profile rail 12. Moreover, attachment of the screw member with the embodiments of profile rails 1 and 12 shown in FIGURES 1 and 2 respectively, can take place in two positions which are spatially displaced about 90°, in other words, the longitudinal axis 9 of the screw 8 or 14 can, as desired, assume the position shown in FIGURE 1 or the position shown in FIGURE 2 which is displaced about 90° from that shown in FIGURE 1.

Now, in order to increase the rigidity or stiffness of a rail construction it is possible to combine or assemble two rail members in the manner shown in FIGURE 3. In this exemplary embodiment, it has been assumed that two profile rail members 1 of the type shown in FIGURE 1 are placed in abutting relation in the manner shown in FIGURE 3. Further, a common connecting plate 20 or equivalent structure, and which in reality is analogous to the nut member 7 or 22 of the embodiments of FIGURES 1 and 2, is disposed in the longitudinal groove 6 of the profile rail members 1. Additionally, two threaded openings, schematically indicated by reference numerals 21, are provided at the aforementioned common connecting plate 20 for a pair of screws or screw members 8. It will be readily apparent that the physical structure and mode of operation of the embodiment of FIGURE 3 is completely analogous to that previously considered with regard to the embodiment of FIGURE 1.

Turning attention now to FIGURES 4 and 9 it will be recognized that such shows the releasable, yet positive interconnection of three profile rails 1a, 1b and 1c with one another, and the cross-sectional configuration which corresponds to that shown in FIGURE 1. Specifically, it will be apparent that the rail member 1a extends substantially in vertical direction whereas the rail member 1b extends in horizontal direction, and the further horizontally extending rail member 1c is spatially displaced about 90° with respect to the spatial position of the rail member 1b. As a result, the rail members 1b and 1c are at substantially the same elevational position, in other words both of the leg members 2 thereof are disposed in a common horizontal plane. In order to attach these three profile rail members 1a, 1b and 1c to one another there is provided a three-legged attachment element 25 of the type shown in greater detail in FIGURE 5. This attachment element 25 incorporates a first leg member 26 extending in vertical direction, a second leg member 27 extending in horizontal direction, and additionally, a third leg member 28 which likewise also extends in horizontal direction, yet is displaced about 90° with respect to the previously considered leg member 27, as will be readily evident by inspecting FIGURE 5. The leg member 26 is provided with a shoulder 29 in order that the outer surfaces of the rail members can flushly adjoin with respect to one another.

Furthermore, each of the leg members 26, 27 and 28 is provided with a threaded opening 30 into each of which a respective short screw member 31 or the like can be introduced. Each such screw member 31 is preferably provided with an internal hexagonal recess or opening 32, as shown, and the respective forward or free end of which bears or presses against the inner surface or wall of the associated profile rail member, in the manner previously considered. The width b of each of the leg members 26, 27 and 28 essentially corresponds to the width of the threaded nut 7 or approximately to the dimension a (FIGURE 7) of the profile rail, so that each leg member 26, 27 and 28 is either pressed against the shoulder 4 or the shoulder 5 when tightening the associated screw member 31. In this manner it is possible to fixedly clamp the three rail members 1a, 1b and 1c to one another with the aid of the three-legged attachment element 25 of FIGURE 5. As far as the dimension a considered above is concerned, such corresponds to the spacing between the marginal edge 5a of the shoulder 5 and the front surface or face 4a of the other shoulder 4, and as was developed during the discussion of the embodiment of FIGURE 1.

It should also be self-evident that in lieu of an attachment element, such as element 25 of FIGURE 5, which has three leg members, it would also be readily possible to use an attachment element with only two leg members which extend at right angles with respect to one another. By means of such a modified form of attachment element it would be possible to interconnect two profile rails with one another.

FIGURE 6 depicts a further embodiment of inventive profile rail 34. This profile rail 34 can be considered as two connected substantially U-shaped profile rail members or ledge members 80, 81 which are connected with one another at a plane or joinder or corner 35. Moreover, these two profile rail members 80, 81 are turned about 90° with respect to one another, so that their open ends are disposed at the same side, as shown. The width e of the one U-rail or ledge member 80 and the width f of the other U-rail or ledge member 81 are the same size. A screw member 8 provided with threading 8b extends with its forward or free end 8a into the channel 36 of the U-shaped rail member 80 and the threaded nut 37 which has been threaded onto this screw member 8 partially extends into the channel 38 of the other U-shaped rail member 81.

Just as was the case with the previously considered embodiments, here also when tightening the screw member 8 the forward or free end 8a of the aforesaid screw member comes into contact with the base or wall of the groove, whereupon the outer front face 37a of the threaded nut 37 comes to bear against the leg member 39, so that there is obtained a positive clamping connection. Also as with the previous embodiments of FIGURES 1 and 2, here also the screw member 8 can be inserted in a position which is spatially displaced through about 90° at an optional location in the profile rail 34. The form of profile rail 34 shown in FIGURE 6 is especially suitable for being assembled together with plates or boards 40, with at least one of the U-shaped profile rail members, in this case profile rail member 80, at least partially engaging with a longitudinal groove 82 provided at the aforesaid plate or board 40.

FIGURE 7 depicts a further embodiment of profile rail 83 which differs from the profile rail shown in FIGURE 2 insofar as the longitudinal slots 15, 16 of FIGURE 2 are widened in this embodiment to provide the double groove means 84, 85. As shown, the base of the double groove means or longitudinal slot means 84 and 85 is each provided with a central shoulder or projection 41, so that in each of these longitudinal slots or double groove means 84, 85 it is possible to optionally mount either thin plate 43 or a thicker plate 42 or the like which fills out the entire width or side of the associated longitudinal slot or double groove means 84 or 85. Insofar as the resilient longitudinal groove 6 is concerned, and which is bounded by the leg members 86, 87 of the profile rail 83, such longitudinal groove can be considered as a section of a square having the side length c. The spacing a which extends between the inner marginal edge 88 of the shoulder 89 and the front face or surface 90 of the other shoulder 91 is larger than c/2 and smaller than 3/4c. The dimension a is preferably about two thirds of the length c.

FIGURE 8 illustrates a profile rail 1 which is similar to that shown in the embodiment of FIGURE 1 and which is externally surrounded by a covering panel or ledge member 43. This covering panel or ledge member 43 exhibits at its ends longitudinal slots 44 which are similar in structure to the longitudinal slots or double groove means 84, 85 of the embodiment of FIGURE 7. This covering panel or profile 43 is provided with slightly inwardly directed edges 44 which engage somewhat behind the thickened ends in order to thereby render possible a good attachment betwen the profile rail 1 and the covering panel or ledge 43.

FIGURES 10 and 11 depict a further embodiment of profile rail 51 which is somewhat differently configured and wherein four resilient longitudinal or lengthwise extending grooves 92 are provided, one at each corner of the profile rail 51, so that there results a hollow profile rail configuration having an approximately cross-shaped cross-sectional form. With regard to this cross-shaped profile rail 51 it will be recognized that if imaginary planes are applied at the outer surface of this profile rail 51—viewed from the front—such imaginary planes enclose a square. Continuing, it will also be apparent that at the outer ends of the leg members 93, 94 there is provided a respective longitudinal rib or shoulder 66 having an undercut region 67.

At such type profile rail 51 as just considered it is possible to secure shelf carrier means or supports 52. Such shelf carrier means or supports 52 each exhibit a first leg portion 53 and a second leg portion 54 which extends at about right angles to the first leg portion 53. At the upper or free end 53a of the first leg portion 53 there is arranged a holding bolt 64, or equivalent structure, which engages behind the longitudinal rib or shoulder 66, as shown, and engages via radially enlarged head portion 65 in the undercut portion or region 67. A clamping screw 55 or the like is disposed as far as conveniently possible from this holding bolt 64 and has a forward end 55a which can be brought to bear against the side wall 56 (FIGURES 11 and 12). As best seen by referring to FIGURE 12, this clamping screw 55 is provided with an internal hexagonal recess 55b. By appropriate screwing in or tightening this clamping screw 55 the leg member 53 of the carrier means or support 52 comes to bear against the longitudinal rib or shoulder 66, whereby the shelf carrier 52 can be fixed at any desired elevational position. Now, in order to remove this shelf carrier 52 the clamping screw 55 is initially loosened and turned out to such an extent that it extends approximately flush with the leg member 53 at the side of the profile rail 51, whereupon the shelf carrier 52 is rocked in the direction of the arrow A about the holding bolt 64, so that it can be released from the profile rail 51. For this purpose, the holding bolt 64 is arranged at the region of the free, upper end 53a of the first leg member 53 and the upper, inner corner 53b of such leg member 53 is rounded off.

FIGURE 13 depicts an embodiment which has a profile rail configuration substantially as shown in FIGURE 11, with the difference that here the longitudinal ribs or shoulders 66 and the undercut region 67 are missing. On the other hand, the side surfaces 69 and 70 are appropriately linearly extended. With this embodiment the first leg member 53 of the shelf carrier 52 or the like can come to bear, on the one hand, at the side surface 69 and, on the other hand, at the shoulder 71 disposed behind the side surface 70. In so doing, the holding bolt means 74 or the like engages behind the shoulder 72 at the inside of the profile rail 51 and braces itself against the side surface 70. The clamping screw 55 (not shown) which is also provided in this embodiment, works in analogous manner to the clamping screw 55 shown and described with regard to the previous embodiment of FIGURES 10 to 12.

Since the side surfaces 69 and 70 extend at about right angles to one another and are of the same length, it is possible for the shelf carrier or support means 52 to be inserted and fixed at each of the four corners in two positions which are displaced or pivoted about 90° with respect to one another. Moreover, in lieu of an angleshaped shelf carrier 52 it would be also possible to attach in the same way a support plate 75 or the like, as such has been schematically depicted in FIGURE 10 by phantom lines.

Finally, it is mentioned by way of completeness that the term "screw member" or similar expressions as well as the term "nut member" or equivalent expressions are used herein in their broader sense and are not limited solely to threaded screws and nuts as usually thought of when using such terms, but rather, also encompass any equivalent structure, for instance threaded bolts or shafts as well as plant members having threaded openings therethrough and which essentially function as standard nut members.

While there is shown and described present preferred embodiments of the invention it is to be distinctly understood that the invention is not limited thereto but may be otherwise variously embodied and practiced within the scope of the following claims. Accordingly,

What is claimed is:

1. In combination, a profile rail, at least one attachment element provided for said profile rail, said profile rail having at least one longitudinal groove defined by a pair of generally planar walls joined at substantially right angles to one another, a pair of longitudinal shoulders provided for said longitudinal groove at the free ends of said walls, said pair of longitudinal shoulders being disposed at substantially right angles with respect to one another, said attachment element incorporating means defining at least one threaded opening, screw means engaging with said threaded opening with the forward end of said screw means being adapted to abut one of said walls, the major diameter of said screw element being substantially equal to the spacing between the under surface of one of said shoulders and the inwardly facing side surface of the other shoulder, whereby one of said shoulders secures said screw means against lateral displacement, said attachment element bearing against the under surface of said other shoulder when said screw means presses against said profile rail.

2. The combination as defined in claim 1, wherein said profile rail is formed of a sheet metal strip having flexed edge portions which form said pair of shoulders.

3. The combination as defined in claim 1, wherein said profile rail is substantially mirror symmetrical with respect to a diagonal plane taken through the point of joinder of said pair of leg members at a location defining a corner of said profile rail.

4. The combination as defined in claim 1, wherein each of said generally planar wall members of said profile rail is provided with a slot which is open at the marginal region of the associated wall member and extending in lengthwise direction of said profile rail, each said slot being intended to receive a cover plate.

5. The combination as defined in claim 1, wherein said means defining at least one threaded opening comprises at least one nut member, said profile rail being dimensioned such that commercially available nut members and screw means can be secured at said profile rail, wherein said nut member in the inserted condition is secured against rotation.

6. The combination as defined in claim 1, wherein said profile rail includes wall means bounding said longitudinal groove, said screw means pressing against at least a portion of said wall means when said attachment element bears against said other shoulder.

7. The combination as defined in claim 1, wherein said attachment element includes an attachment piece having three legs, said three legs being spatially positioned with respect to one another such that the axes of said three legs are each disposed at substantially right angles with respect to one another, each of said legs being provided with at least one threaded opening, said screw means being a screw member inserted in each respective threaded opening.

8. The combination as defined in claim 7, wherein the width of each of said three legs approximately corresponds to the spacing between the inner edge of one of said shoulders of one wall member of said profile rail and the front surface of the other shoulder of said profile rail.

9. The combination as defined in claim 1, wherein said profile rail, when viewed in cross-section, is comprised of two substantially U-shaped profile members which are spatially displaced approximately 90° with respect to one another and which meet at a location defining a corner of said profile rail, said substantially U-shaped profile members being approximately mirror symmetrical with respect to a diagonal plane taken through said corner of said profile rail.

10. The combination as defined in claim 1, wherein the end of each wall member of said profile rail is provided with a double groove means.

11. The combination as defined in claim, further including a covering panel surrounding said profile rail, said covering panel incorporating leg members, the respective ends of which are provided with groove means.

12. The combination as defined in claim 11, wherein said covering panel is formed of plastic.

13. The combination as defined in claim 1, wherein said profile rail possesses a substantially cross-shaped cross-sectional configuration and exhibits four resilient longitudinal grooves.

14. In combination, a profile rail, at least one attachment element provided for said profile rail, said profile rail having at least one longitudinal groove, a pair of longitudinal shoulders provided for said longitudinal groove, said pair of longitudinal shoulders being disposed at substantially right angles with respect to one another, said attachment element incorporating means defining at least one threaded opening, screw means engaging with said threaded opening, one of said shoulders securing said screw means against lateral displacement, said attachment element bearing against the other shoulder when said screw means presses against said profile rail, said combination further including support means cooperating with said profile rail, at least one clamping screw for fixedly retaining said support means at said profile rail, said support means possessing a thickness which at most is approximately equal to the spacing between the inner edge of one of said shoulders of said profile rail and the front surface of the other shoulder of said profile rail.

15. The combination as defined in claim 14 wherein undercut portions are provided at the region of said pair of longitudinal shoulders of said profile rail, said support means having a free end, holding means having a head portion cooperating with said free end, said head portion engaging with at least one of said undercut portions of said profile rail.

References Cited

UNITED STATES PATENTS

| | | | |
|---|---|---|---|
| 3,144,265 | 8/1964 | Humble | 287—54 |
| 3,343,811 | 9/1967 | Kusel et al. | 287—54 |
| 3,356,403 | 12/1967 | Sak et al. | 287—189.36 |

FOREIGN PATENTS 612,687  11/1960  Italy.

CARL W. TOMLIN, *Primary Examiner.*

RAMON S. BRITTS, *Assistant Examiner.*

U.S. Cl. X.R.

287—54